June 6, 1967 A. R. KANTROWITZ ET AL 3,324,318
MEANS FOR AND METHOD OF PREVENTING HALL CURRENTS
IN ELECTRICAL EQUIPMENT
Filed Dec. 21, 1959 3 Sheets-Sheet 1

ARTHUR R. KANTROWITZ
RICHARD J. ROSA
RICHARD M. PATRICK
  INVENTORS

BY *Alden D. Redfield*
   *Warren Kunz*
              ATTORNEYS

June 6, 1967 A. R. KANTROWITZ ETAL 3,324,318
MEANS FOR AND METHOD OF PREVENTING HALL CURRENTS
IN ELECTRICAL EQUIPMENT
Filed Dec. 21, 1959 3 Sheets-Sheet 3
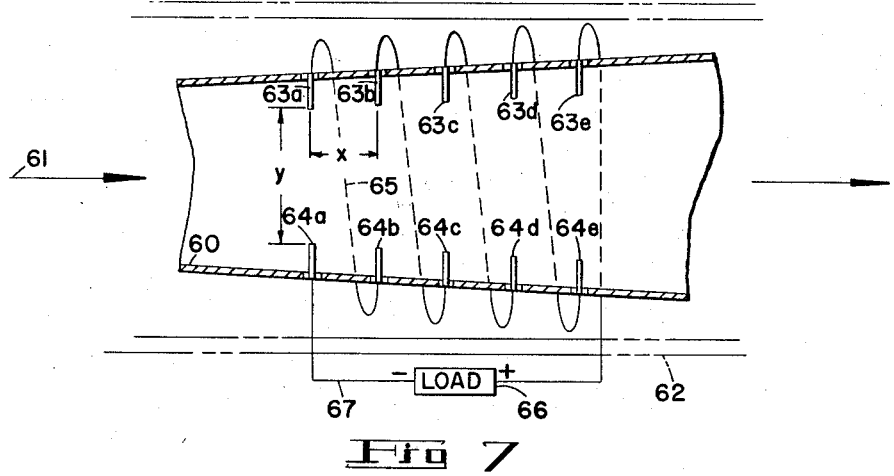
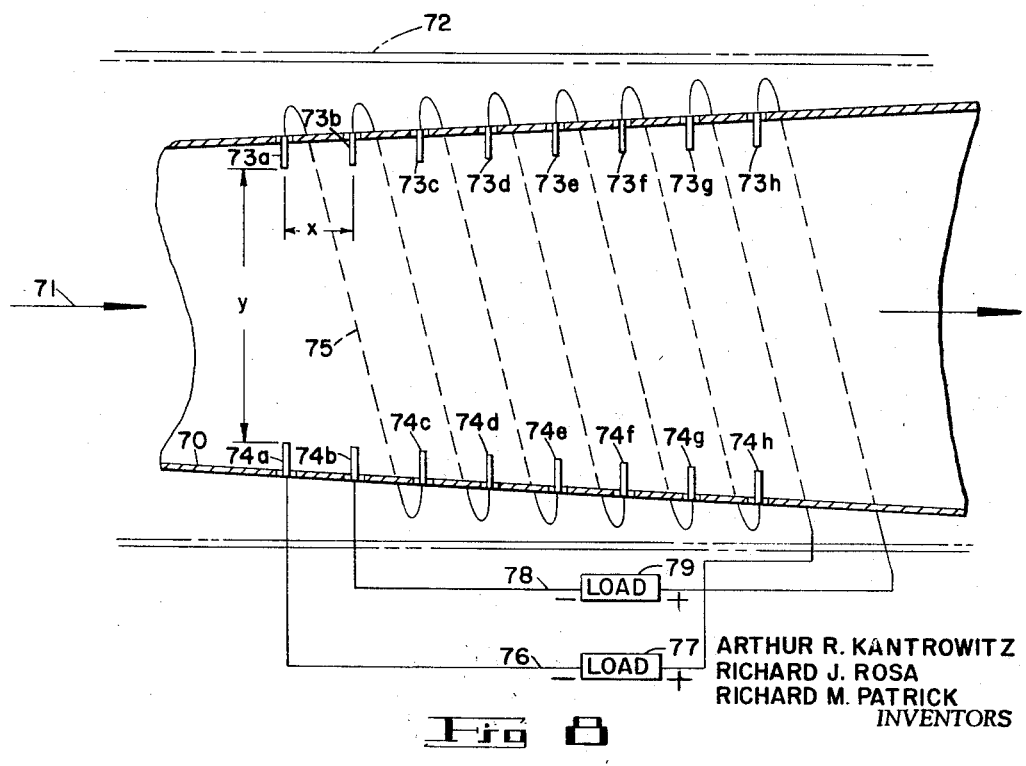
ARTHUR R. KANTROWITZ
RICHARD J. ROSA
RICHARD M. PATRICK
INVENTORS
BY Alden D. Redfield
Warren Kent
ATTORNEYS _United States Patent Office_

3,324,318
Patented June 6, 1967

3,324,318
MEANS FOR AND METHOD OF PREVENTING HALL CURRENTS IN ELECTRICAL EQUIPMENT
Arthur R. Kantrowitz, Arlington, and Richard J. Rosa and Richard M. Patrick, Reading, Mass., assignors to Avco Corporation, Cincinnati, Ohio, a corporation of Delaware
Filed Dec. 21, 1959, Ser. No. 860,973
13 Claims. (Cl. 310—11)

The present invention relates to a means for and method of preventing the flow of Hall currents in electrical equipment and more particularly in magnetohydrodynamic (hereinafter abbreviated "MHD") generators and accelerators. For convenience, the invention is described with particular reference to MHD generators, which generate power by movement of electrically conductive fluid relative to a magnetic field, but is not limited to such applications.

Although the possibility of generating power by the interaction of an electrically conductive fluid and a magnetic field has long been known, it has not been until recent years that such MHD devices have been investigated seriously for use in industry. This is illustrated by the Rudenberg Patent 1,717,413, which issued in 1929 on a Thermoelectric Apparatus, showing that the basic principles are well known. Practical problems, however, such as the flow of Hall current within generators, have severely limited advances in the field.

MHD generators usually employ an electrically conductive working fluid from a high temperature, high pressure source. From the source, the fluid flows through the generator with which is associated a magnetic field and electrodes between which a flow of current is induced by movement of the fluid relative to the field. The fluid exhausts to a sink, which may simply be the atmosphere, or in more sophisticated systems, may comprise a recovery system including pumping means for returning the fluid to the source. The working fluid may comprise a high temperature, high pressure gas, such as helium or argon, to which is added about 1% sodium, potassium or cesium to promote ionization and hence electrical conductivity. The gas is composed of electrons, positive ions, neutral atoms and sub-atomic particles and may, for convenience, be termed "plasma."

As the plasma flows through the generator in the presence of an electric field and a magnetic field oriented at right angles to the electrical field, curved movements of charged particles occur under the influence of both fields. By virtue of such movements, separation of negative and positive charges occurs in the plasma, resulting in a substantial potential gradient along the length of its flow. Under the influence of the potential gradient, current will circulate longitudinally through the plasma and electrodes of the generator. These currents, which are known as "Hall currents," oppose direct flow of current through the plasma between the electrodes and constitute a serious loss of operating efficiency.

Briefly, the present invention comprises a means for and method of establishing along the length of the plasma stream a potential gradient comparable to that which tends to be established within the plasma by the Hall effect. By matching the gradient, preferably along the electrodes, to the gradient established within the plasma by the Hall effect, potential differences between the plasma and the electrodes, necessary to the flow of Hall current, are eliminated and the Hall current itself is prevented from circulating within the generator. A number of devices are disclosed in the present specification for carrying out the method. These may involve the use of segmented electrodes to interrupt the path for flow of Hall current. Further, by selectively interconnecting the segments of the electrodes, it is possible to establish the preferred gradient along the path of plasma flow whereby potential differentials that would otherwise encourage flow of Hall current are avoided.

From the foregoing, it will be understood that an object of the present invention is to provide a means for and method of preventing flow of Hall current within electrical equipment.

More specifically, it is an object of the invention to provide a means for and method of preventing circulation of Hall current within MHD accelerators and generators.

A further object of the invention is the provision of segmented electrodes in MHD equipment.

Still another object is the provision in MHD equipment of segmented electrodes interconnected in a preferred manner to establish potential gradients which prevent the flow of Hall current.

It is also an object of the invention to provide an MHD generator with segmented electrodes which are interconnected to enable the generator to generate power at relatively high voltage while, at the same time, eliminating Hall current losses.

Yet another object of the invention is the provision of an MHD generator having preferred spacing between adjacent electrodes and those transverse of the plasma stream whereby, in the normal operation of the generator, circulation of Hall currents is eliminated.

It is also an object of the invention to provide the following improvements in MHD equipment:
(a) Increased efficiency by virtue of increased conductivity through the working plasma in a direction perpendicular to the electrodes.
(b) Reduction in generator size through increased over-all operating efficiency.
(c) Improved electrode life through controlled formation of current paths.

The novel features that we consider characteristic of our invention are set forth in the appended claims; the invention itself, however, both as to its organization and method of operation, together with additional objects and advantages thereof, will best be understood from the following description of specific embodiments when read in conjunction with the accompanying drawings, in which:

FIGURE 7 shows a modified MHD generator having segmented electrodes which are interconnected to generate power at relatively high voltage; and FIGURE 8 shows still another modification of an MHD generator having segmented electrodes interconnected in a plurality of separate circuits for supplying power at high voltage to separate loads.

General principles

Figure 1:
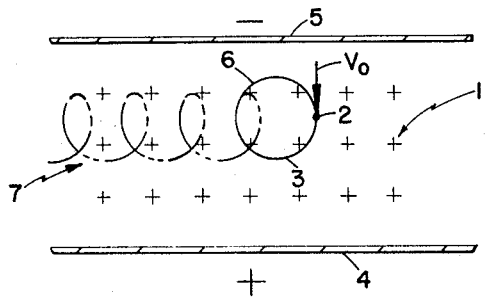
FIGURE 1 illustrates electron movement in a magnetic field, both in the absence of and in the presence of an electrical field.

An appreciation of Hall currents makes possible a fuller understanding of the present invention. Toward that end, attention is directed to FIGURE 1 showing, by conventional notation, a magnetic field 1 assumed, for the purpose of illustration, to be directed into the plane of the paper. An electron 2, having an initial velocity $v_o$, is assumed to be present in the magnetic field. In accordance with conventional principles of electron ballistics, the electron will describe a circular path 3 in the plane of the paper, the force maintaining the electron in its circular orbit being proportional to the charge of the electron and the cross product of its velocity $v_o$ and the density of the magnetic field. Such movement of charged particles is clearly set forth in the well-known text, "Electronic Fundamentals and Applications," by John D. Ryder, published by Prentice-Hall, Inc., in 1954 (pages 22 et seq.).

Since the force acting on the electron is always perpendicular to its motion and velocity, no work is done on it by the magnetic field, and its velocity remains unchanged except in direction. Theoretically, the electron will continue its movement along the circular path 3. If, however, an electric field is imposed normal to the magnetic field, as by electrodes 4 and 5, the electron will depart in its movement from its circular orbit. Assuming for purposes of illustration that the electrode 4 is positively charged, while electrode 5 is negatively charged, the electron will depart from its circular orbit at 6 and describe a looped path, generally designated 7. This results from the gradual deceleration of the electron as it recedes from the positive electrode and approaches the negative electrode. As the electron changes its direction of movement and moves toward the positive electrode, the cross product of its velocity of movement and the magnetic field density again causes the electron to move in a circular orbit. As the effect is repeated, the electron describes a looped path such as illustrated.

The foregoing description with reference to FIGURE 1 assumes a charged particle moving without possibility of collision with other particles. If the influence of collisions is considered, a condition such as illustrated by FIGURES 2 and 3 occurs.

Figure 2:
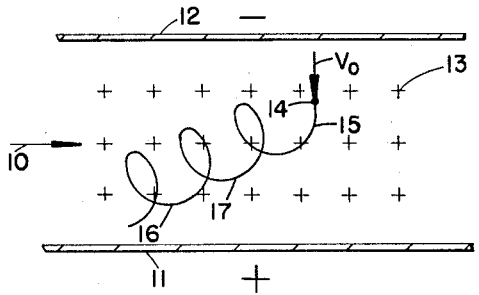
FIGURE 2 illustrates electron movement in a plasma stream in the presence of both magnetic and electrical fields under conditions where the product of the cyclotron frequency and the mean free time between particle collisions is much greater than 1.

In FIGURE 2 it is assumed that a plasma stream 10 is moving from left to right between electrodes 11 and 12. Magnetic field 13 may be assumed to exist between the electrodes moving into the plane of the paper. Assuming an electron 14 with an initial velocity $v_o$ to be present in the space between the electrodes, the electron will tend to describe a circular orbit in the plane of the paper, as indicated at 15. Assuming first that no electrical field is present between the electrodes, the electron will continue in its circular orbit as described with reference to FIGURE 1. If, however, electrodes 11 and 12 are made positive and negative, respectively, the electron will tend to describe a looped path of movement similar to that illustrated at 7 in FIGURE 1.

The effect of collision of other particles of the plasma stream with the electron may now be considered. Looped curve 16 in FIGURE 2 shows the resulting path of the electron under the influence of an electric field and the influence of collisions with other plasma particles under conditions where the product of $\omega\tau$ is much greater than 1, $\omega$ being the electron cyclotron frequency and $\tau$ being the electron mean free time between collisions. For simplicity, the curve 16, and the other curve to be described with reference to FIGURE 3, have been drawn relative to the plasma stream as a stationary framework of reference. If the product of $\omega\tau$ is much greater than 1, it is apparent that the frequency of the electron in its circular orbit may be high and the time between successive collisions of other particles with the electron quite long. Under such conditions the electron may describe a complete circular orbit before being deflected by particle collision into an adjacent circular orbit such as 17. Because of the integrated influence of collisions, curve 16 will descent generally from the right to the lower left, as in FIGURE 2, if the plasma stream is regarded as stationary. In other words, the effect of electrical field and particle impact on an electron moving in a magnetic field causes the electron to spiral along a looped curve extending at an angle between the electrodes.

Figure 3:
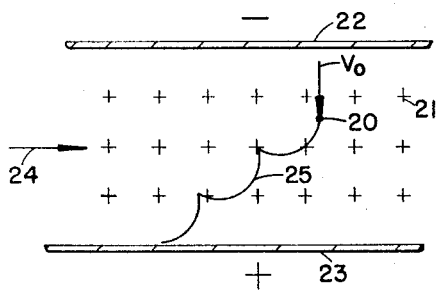
FIGURE 3 shows electron movement in a plasma stream in the presence of both magnetic and electrical fields under conditions where the product of the cyclotron frequency and the mean free time between collisions is less than 1.

Illustrated in FIGURE 3, is the movement of an electron under conditions where the product of $\omega\tau$ is less than 1. Under such conditions collisions of particles with the electron are much more frequent than in FIGURE 2, and the effect of electron deflection due to particle collision becomes more pronounced. In FIGURE 3 the electron 20, again assumed to have initial velocity $v_o$ in magnetic field 21, moves under the influence of an electric field imposed by electrodes 22 and 23. Because of the frequency of collisions with particles in the plasma stream 24, however, the electron is deflected along a path such as illustrated at 25. It will be noted that the collisions are so frequent that the electron has little or no opportunity to describe any major portion of the circular orbit that it would normally describe in a magnetic field if it were free of extraneous influences.

To this point the discussion has been confined to electron movement in a magnetic field. It will be understood by those skilled in the art that other charged particles, such as positive ions, also describe circular paths in the presence of a magnetic field, although the direction of movement is reversed because of the change in the sign of the charge of the particle. The circular movements of positive ions may, however, be disregarded because of their relatively lower velocity and their greater mass compared to electrons. This will be apparent when it is remembered that the radius of the circular path described by a charged particle is a function of the product of both its mass and velocity. For this reason positive ions tend to move along paths having a very large radius of curvature, and no net movement such as that described in FIGURES 1, 2 and 3 occurs. Instead, the plasma stream tends to carry the relatively sluggish positive ions downstream while the electrons are simultaneously being deflected and moving generally against the stream. This is the source of Hall current as will now be described.

Figure 4:
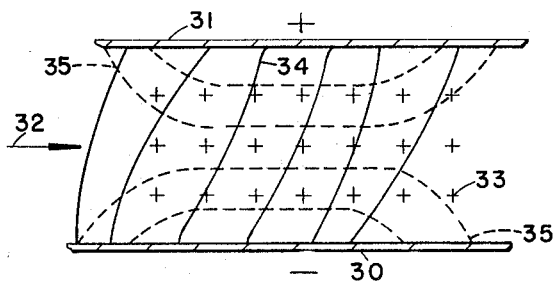
FIGURE 4 is a diagrammatic illustration of the flow of Hall currents within a linear MHD generator.

Directing attention to FIGURE 4, there is shown a pair of electrodes 30 and 31 between which moves a stream of electrically conductive plasma 32. A magnetic field 33 is provided perpendicular to and going into the plane of the paper. For the indicated direction of magnetic field and plasma flow, the induced E.M.F. is such that the electrode 30 is negative and the electrode 31 is positive. Because of the generator action, electrode 30 serves as the anode and electrode 31 as the cathode; the current flows along lines 34 from anode 30 to cathode 31. Now, because the gas is moving relative to the observer, lines 34 (FIG. 4) do not represent electron drift paths but rather the direction of relative motion between the electrons and positive ions which is, by definition, current. It will be noted that the lines of current flow are inclined at an angle to the electrodes and do not constitute the shortest path therebetween. This is a direct result of electron movement such as described with reference to FIGURE 3 since the electrons are the principal current carrier within the plasma stream. Lines 34 designate the net resultant of current flow determined by a component transverse to the plasma stream and one parallel to the plasma stream. The parallel component is known as Hall current, and is indicated by dash lines at 35 in FIGURE 4. The Hall current flows longitudinally through the plasma and returns through the electrodes. This current in no way contributes to the useful operation of the device and, in fact, results in current flow between the electrodes along a more indirect path of reduced cross section than would otherwise be possible. As a result, more energy is dissipated through joule heating within the generator, reducing its efficiency or necessitating an increase of generator size for a given efficiency and net output.

Conventional MHD generator

Figure 5:
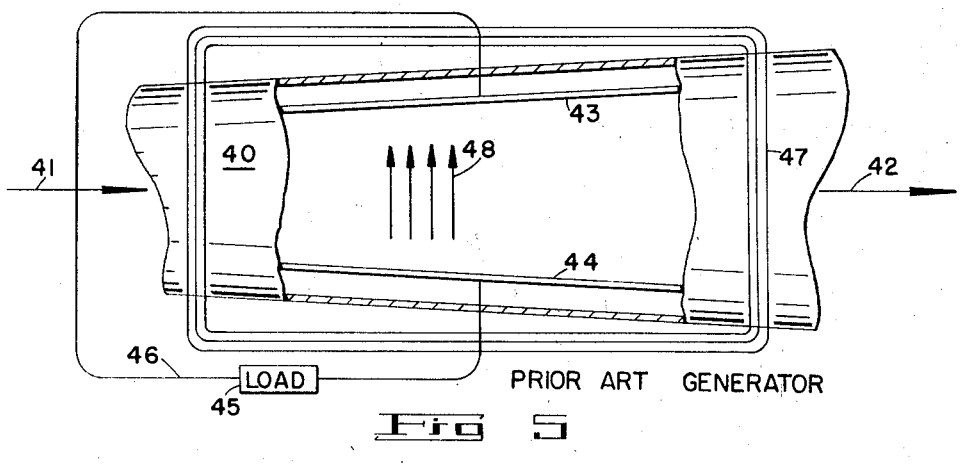
FIGURE 5 is a schematic illustration of a conventional MHD generator.

Shown in FIGURE 5 is a simple form of conventional MHD generator. It comprises a generally divergent duct 40 into which high temperature plasma under pressure is supplied at 41, the plasma leaving the generator at 42. The plasma may be at 3000° K. and under a pressure of ten atmospheres. Because of its high temperature and composition, the plasma is electrically conductive and may have a conductivity in the order of 100 mhos/meter. Within the duct are provided electrodes 43 and 44 which are interconnected with load 45 by conductor 46. A magnetic field coil 47, comprising a continuous electrical conductor that may be supplied with electricity from any desirable source (not shown) or from the MHD generator itself, surrounds the exterior of duct 40 and provides a magnetic field transverse to the plasma stream and perpendicularly into the plane of the paper. The movement of the gas stream relative to the magnetic field induces an E.M.F. 48 between the electrodes.

Reduced to simplest terms, the plasma comprises an electrical conductor forced through a magnetic field causing thereby the induction of an E.M.F. in the conductor.

In a conventional MHD generator of the type shown in FIGURE 5, Hall currents will be present as explained with reference to FIGURES 1–4. As a result, the generator will be characterized by internal losses and inefficiencies that may, under some operating conditions, be extremely detrimental.

Figure 6:
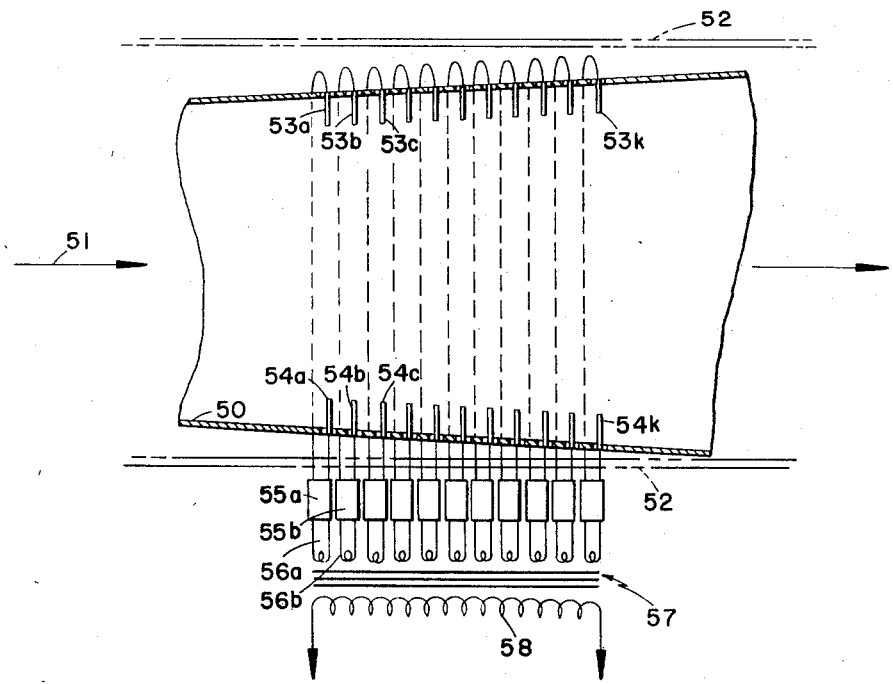
FIGURE 6 is a schematic illustration of an MHD generator having segmented electrodes arranged in accordance with the teaching of the present invention.

MHD generator with segmented electrodes (FIGURE 6)

In FIGURE 6 is shown diagrammatically an MHD generator comprising a divergent duct 50 to which is supplied a high temperature, high pressure plasma 51. With it is associated a magnetic field coil, indicated schematically by phantom lines at 52. The magnetic coil provides a magnetic field perpendicular to the plane of the paper and transverse of the plasma stream.

In FIGURE 6, however, it will be noted that the electrodes are segmented, i.e., the electrodes at each side of the duct comprise separate electrically insulated segments designated 53a, 53b, 53c, . . . 53k and 54a, 54b, 54c, . . . 54k. It will be noted that each of the electrode segments of each group are positioned in side by side relationship, the groups of segments on opposite sides of the duct defining transverse paths for current flow normal to the direction of both the plasma stream and the magnetic field flux.

Attention is now directed to the electrical connection of electrode segments 53a and 54a with an inverter 55a. The inverter, which may be of a conventional type, is connected to primary 56a of a multi-winding transformer, generally designated 57, having a common secondary 58 for delivering A.C. power.

In a similar manner electrode segments 53b and 54b are connected to another inverter 55b having a transformer primary 56b. The transformer primary 56b is also coupled with the secondary 58 in time phase relationship with the primary 56a. The other opposed pairs of electrodes are similarly connected to separate inverters coupled to secondary 58, as illustrated.

Since no continuous path is provided longitudinally through the electrodes parallel to the direction of plasma flow, Hall currents cannot form within the plasma. The segmentation of the electrodes in effect completely breaks the path of Hall current flow. In this way, the losses associated with Hall currents are eliminated and improved over-all operation is obtained.

It should be noted that the electrode segments will not all operate at the same potential level since, without flow of Hall current, a Hall potential builds up longitudinally of the plasma stream. In other words, electrode 53k will float at a higher potential than electrode 53a; however, the voltage difference between any pair of opposed electrode segments, such as 53a, 54a, 53k, 54k will be substantially the same. Under equilibrium conditions the Hall potential opposes the longitudinal drift of charged particles described with reference to FIGURES 1–4.

MHD generator with series connected segmented electrodes

Shown in FIGURE 7 is another modification of the invention comprising an MHD generator having a duct 60 to which plasma 61 is supplied as has already been described. As in the FIGURE 6 embodiment of the invention, a magnetic field coil is provided at 62 and establishes a magnetic field perpendicular to the paper and transverse of the plasma stream flowing through duct 60. The electrodes are segmented, in much the same manner as described in reference to FIGURE 6, and comprise a series of discrete segments 63a, 63b . . . 63e and opposite these electrode segments, 64a, 64b . . . 64e. Contrary to the embodiment of FIGURE 6, however, the opposed electrode segments are connected in series. In other words, segment 63a is connected by conductor 65 to electrode segment 64b. Similarly electrode segments 63b and 64c are interconnected; 63c–64d and 63d–64e are interconnected. The terminal electrode segments 64a and 63e are interconnected externally of the generator to load 66 by means of conductor 67.

In this embodiment of the invention, the E.M.F. generated by movement of plasma past opposite electrode segments, such as 63a–64a, are added by the series connections so that power delivered to the load 66 is at the sum of the E.M.F. outputs of all of the pairs of electrode segments. Being connected in series, each of the electrode segments on a given side of the duct, such as 63a–63e, operates at a successively higher potential level than its immediately preceding electrode segment. In other words, the segments define a potential gradient longitudinally through the duct. As will be explained in greater detail, this potential gradient can be chosen to match the potential gradient produced by electron and positive ion separation described with reference to FIGURES 1–4. Thus, the potential gradient of the electrode segments matches the potential gradient of the plasma stream so as to negate any difference between electrode potential and the Hall potential within the plasma. Internal circulation of Hall currents is prevented, and improved operation results, as has been explained.

MHD generator with series-connected segmented electrodes in multiple circuits In FIGURE 8 is illustrated an MHD generator having a duct 70 to which plasma 71 is supplied as already explained. As in the FIGURE 6 and FIGURE 7 embodiments, the magnetic field coil 72 provides flux through the duct perpendicular to the plane of the paper. As in the other embodiments of the invention, the electrodes at opposite sides of the duct are segmented, electrode segments 73a–73h being provided at the upper portion of the duct and 74a–74h being provided at the lower portion of the duct, as viewed in FIGURE 8. As already explained in connection with FIGURE 5, the passage of electrically conductive fluid through the magnetic field generates an E.M.F. that is uniform in direction and substantially equal in magnitude between each of the opposed electrode segments, such as 73a–74a. Attention is called, however, to the difference in interconnection of the electrode segments compared to those shown in FIGURE 7. In FIGURE 8, segment 73a is interconnected by the conductor 75 to segment 74c. Electrode 73b is interconnected to segment 74d, etc. In other words, each of the electrode segments at the upper part of the generator is connected in staggered arrangement to downstream electrode segments at the bottom of the duct. Thus, electrode segment 74a is in common series circuit with the plasma and with the following electrode segments: 73a, 74c, 73c, 74e, 73e, 74g, and 73g. Terminal electrode segments 74a and 73g in turn are connected by conductor 76 to a load 77. In similar fashion, electrode segment 74b is in common series circuit with the following electrode segments: 73b, 74d, 73d, 74f, 73f, 74h and 73h. Terminal electrode segments 74b and 73h are in turn connected by conductor 78 to load 79. With this arrangement of connections, two entirely separate intercalated circuits can be operated from one generator. If desired, the loads 77 and 79 may comprise inverters feeding through separate primaries to a common transformer having a single secondary. The manner of connecting loads, however, is a matter of choice.

As will now be understood from the foregoing description of the invention, the electrode segments at each side of the generator define a potential gradient in the direction of the plasma flow. In other words, in FIGURE 8, segment 73h operates at a higher positive potential than segment 73a. The same is true with respect to segment 74h compared to segment 74a. The gradients defined in this manner match and oppose the internal longitudinal potential gradient that is established through movement of charged particles, as described with reference to FIGURES 1–3. Since the potential existing within the plasma stream is matched at any point by the potential of an adjacent electrode, no potential difference exists tending to set up current flow longitudinally through the plasma and the electrodes. Hall currents are effectively eliminated with an over-all improvement in operation.

Spacing of adjacent electrode segments

The success of the invention, shown in FIGURES 7 and 8, depends in part on the lateral spacing of adjacent electrode segments in the direction of the plasma flow. For given plasma conditions and a given E.M.F. induced by movement of the plasma past opposed electrodes, a preferred spacing exists which will establish the proper gradient parallel to the stream to oppose Hall current flow. If, for convenience, the lateral spacing between adjacent segments is designated $x$ in the embodiment of FIGURE 7 and the average transverse distance between adjacent segments and the opposed electrode segments is designated $y$, the ratio of the $y$ to $x$ dimension may be determined under idealized conditions (plasma of homogeneous electrical properties, thin boundary layers at the walls of the plasma stream, uniform magnetic field, small potential drops at electrodes) through use of the following formula:

$$\frac{y}{x} = \omega\tau\left(\frac{1-\epsilon}{\epsilon}\right) \quad (1)$$

in which:

$\epsilon$=electrical efficiency of the generator=external load impedance÷load+generator internal impedance
$\omega$=electron cyclotron frequency in radians/sec.
$\tau$=electron means free time between collisions with plasma particles—in seconds (The values for $\omega$ and $\tau$ for any given plasma can be calculated by using the principles set forth in "Physics of Fully Ionized Gases" by Lyman Spitzer, Jr. Interscience Publisher, Inc., 1956, and other standard reference works.)

This equation can be derived from the well-known expression for current flow $j_x$ parallel to the plasma stream:

$$j_x = \frac{\sigma}{1+\Omega^2}(\Omega uB - \Omega E_y - E_x) \quad (2)$$

in which:

$\sigma$=scalar conductivity of the plasma
$\Omega = \omega\tau$
$B$=magnetic field strength
$E_y$=potential gradient between electrodes transverse of plasma stream
$E_x$=Hall potential gradient longitudinally through plasma stream
$u$=macroscopic velocity of plasma stream If the Hall current is to be reduced to zero, the expression for $j_x$ must be equated to zero. Simplifying the resulting expression yields the following ratio of $E_x/E_y$ $$\frac{E_x}{E_y} = \frac{y}{x} = \Omega\left(\frac{1-\epsilon}{\epsilon}\right) = \omega\tau\left(\frac{1-\epsilon}{\epsilon}\right) \quad (3)$$

where:

$$\epsilon = \frac{E_y}{uB}$$

The $y$ to $x$ ratio for the embodiment shown in FIGURE 8 can be determined by use of the following equation:

$$\frac{y}{x} = N\omega\tau\left(\frac{1-\epsilon}{\epsilon}\right) \quad (4)$$

where $N$=number of separate circuits present in the generator=2 for the embodiment of FIGURE 8.

The similarity to Equation 3 will be noted.

An advantage of the FIGURE 8 configuration is that the electrode spacing can be N times closer than in the embodiment illustrated in FIGURE 7. This has the advantage of providing additional electrode area for accommodating current flow and minimizing the size of "dead" spaces between adjacent electrode segments. The provision of numerous low impedance paths for current flow results in increased operating efficiency.

At this point it is well to note that another advantage of the segmented electrodes shown in FIGURES 6–8 is that discrete focal points for formation of current paths, i.e., arcs, are present. In other words, in the case of a long continuous electrode, such as shown in FIGURE 5, there is a tendency for the conducting arcs between the electrodes to concentrate at a relatively few points on the electrodes especially when $\omega\tau$ is greater than one. This results in electrode heating and eventual destruction. In the embodiments of FIGURES 6–8, however, the arcs are inherently directed to all of the plurality of electrode segments and better over-all current distribution and electrode life is obtained.

The ratio of transverse to lateral spacing of electrodes in FIGURE 6 is immaterial since elimination of the flow of Hall currents along the entire length of the duct in that particular version of the invention is dependent upon the lack of any connection between adjacent electrode segments. This eliminates any path for Hall current flow.

Conclusion

For convenience, the foregoing description has been directed primarily to the use of the present invention in MHD generators. It should be understood, however, that the same principles can be applied to MHD accelerators, i.e., devices in which an electrical potential is applied across a magnetic field to accelerate plasma through the field. In a manner similar to that already described, such devices are subject to the Hall effect which can be eliminated through application of the principles of the present invention.

The various features and advantages of the invention are thought to be clear from the foregoing description. Various other features and advantages not specifically enumerated will undoubltedly occur to those versed in the art, as likewise will many variations and modifications of the embodiments of the invention illustrated, all of which may be achieved without departing from the spirit and scope of the invention as defined by the following claims.

We claim:

1. In combination in an MHD generator, a duct for conveying a stream of electrically conductive plasma, means for establishing magnetic flux through said duct normal to the direction of flow of the plasma, and opposed electrodes within said duct aligned perpendicularly to the magnetic flux and the direction of flow of the plasma, each of said electrodes comprising a plurality of discrete segments, selected segments of one of said electrodes being interconnected with segments of said opposed electrode to form through said interconnections and the plasma a plurality of intercalated series circuits, the terminal electrode segments of each intercalated series circuit being connected to a separate load, the ratio of transverse spacing between opposed electrodes to lateral spacing of adjacent segments being in the ratio of $$N\omega\tau\left(\frac{1-\epsilon}{\epsilon}\right)$$

where $\omega$ is the electron cyclotron frequency, $\tau$ is the electron mean free time between particle collisions within the plasma, $\epsilon$ is the electrical efficiency of the generator, and N is the number of intercalated serially connected circuits.

2. In combination in an MHD generator, a duct for conveying a stream of electrically conductive fluid, means for establishing magnetic flux through said duct normal to the direction of flow of the fluid, and opposed electrodes within said duct aligned at an angle to the magnetic flux and the direction of flow of the fluid, each of said electrodes comprising a plurality of separate segments, selected segments of one of said electrodes being interconnected with segments of said opposed electrode to form through said interconnections and the fluid a plurality of intercalated series circuits, the ratio of transverse spacing between opposed electrodes to lateral spacing of adjacent segments being in the ratio of $$N\omega\tau\left(\frac{1-\epsilon}{\epsilon}\right)$$

where $\omega$ is the electron cyclotron frequency, $\tau$ is the electron mean free time between particle collisions within the plasma, $\epsilon$ is the electrical efficiency of the generator, and N is the number of intercalated serially connected circuits.

3. In combination in an MHD generator, a duct for conveying a stream of electrically conductive plasma, means for establishing magnetic flux through said duct normal to the direction of flow of the plasma, and opposed electrodes within said duct aligned perpendicularly to the magnetic flux and the direction of flow of the plasma, each of said electrodes comprising discrete segments, selected electrode segments of said opposed electrodes being interconnected to form through said interconnections and the plasma a plurality of intercalated series circuits wherein each said series circuit includes at least four electrode segments and one electrode segment of each series circuit is disposed intermediate two electrode segments of another series circuit, the terminal electrode segments of said intercalated series circuits being connected to separate loads.

4. Apparatus as defined in claim 3 in which the lateral spacing between adjacent electrode segments establishes a potential gradient matching that existing within the plasma stream due to the Hall effect.

5. In combination, a duct for conveying a stream of electrically conductive plasma, means for establishing magnetic flux through said duct normal to the direction of flow of the plasma, and opposed electrodes within said duct aligned at an angle to the magnetic flux and the direction of flow of the plasma, each of said electrodes comprising a plurality of separate segments, selected electrode segments of said opposed electrodes being interconnected to form through said interconnections and the plasma a plurality of intercalated series circuits wherein each said series circuit includes at least four electrode segments and one electrode segment of each series circuit is disposed intermediate two electrode segments of another series circuit.

6. Apparatus as defined in claim 5 in which adjacent electrode segments are spaced to define a potential gradient matching that existing within the plasma stream in the direction of its flow.

7. In combination, means for conveying an electrically conductive fluid, means for establishing flux through the fluid at an angle to its direction of flow, and opposed electrodes within said first named means, each of said electrodes comprising a plurality of separate segments, selected segments of said opposed electrodes being interconnected to form through said interconnections and the fluid a plurality of intercalated series circuits wherein each said series circuit includes at least four electrode segments and one electrode segment of each series circuit is disposed intermediate two electrode segments of another series circuit.

8. In combination in an MHD generator, a duct for conveying a stream of electrically conductive plasma, means for establishing magnetic flux through said duct normal to the direction of flow of the plasma, and opposed electrodes within said duct aligned perpendicularly to the magnetic flux and the direction of flow of the plasma, each of said electrodes comprising a plurality of descrete segments, selected segments of one of said electrodes being interconnected with segments of said opposed electrode to form through said interconnections and the plasma a series circuit, the ratio of transverse spacing between opposed electrodes to lateral spacing of adjacent electrode segments being in the ratio of $$\omega\tau\left(\frac{1-\epsilon}{\epsilon}\right)$$

where $\omega$ is the electron cyclotron frequency, $\tau$ is the electron mean free time between particle collisions within the plasma and $\epsilon$ is the electrical efficiency of the generator.

9. In combination in an MHD generator, a duct for conveying a stream of electrically conductive plasma, means for establishing magnetic flux through said duct normal to the direction of flow of the plasma, and opposed electrodes within said duct aligned perpendicularly to the magnetic flux and the direction of flow of the plasma, each of said electrodes comprising a plurality of discrete segments, selected segments of one of said electrodes being interconnected with segments of said opposed electrode to form through said interconnections and the plasma between said opposed electrodes a series circuit, adjacent electrode segments being spaced laterally one from another to define a potential gradient substantially matching that existing within the plasma stream in the direction of its flow.

10. In combination, means for conveying an electrically conductive fluid, means for establishing flux through the fluid at an angle to its direction of flow, and a plurality of discrete electrodes spaced from each other within said first named means, said plurality of electrodes being spaced laterally one from another and interconnected to establish a potential gradient matching the potential gradient existing within the fluid in the direction of its flow.

11. The method of preventing circulation of Hall current within a MHD device having a duct through which flows a stream of electrically conductive plasma and having means for establishing magnetic flux through the stream perpendicularly to its direction of flow and having opposed segmented electrodes within the duct between which an electrical field exists mutually perpendicular to the direction of plasma flow and the magnetic flux comprising impressing the potential of predetermined segments of the segmented electrodes on other segments of the electrodes providing a potential gradient along the electrodes parallel to the direction of movement of the plasma substantially matching the potential gradient established by the Hall effect within the plasma whereby potential differentials between the plasma and electrode segments are eliminated and flow of Hall current is prevented.

12. In combination in an MHD generator, a duct for conveying a stream of electrically conductive plasma, means for establishing magnetic flux through said duct normal to the direction of flow of the plasma, and opposed electrodes within said duct aligned perpendicularly to the magnetic flux and the direction of flow of the plasma, each of said electrodes comprising a plurality of discrete segments, selected segments of one of said electrodes being interconnected with segments of said opposed electrode to form through said interconnections and the plasma between said opposed electrodes at least one series circuit, said opposed electrically interconnected electrodes being laterally spaced one from another a distance which places them at substantially the same electrical potential when said generator is operated at its designed load conditions and define a potential gradient substantially matching that existing within the plasma stream in the direction of its flow.

13. A voltage generator comprising: apparatus having a passageway therethrough, said apparatus including means for generating a magnetic field in said passageway; at least one pair of electrodes mounted in and disposed substantially perpendicular to walls defining the longitudinal direction of said passageway; and means for thrusting an ionized gas through said passageway at high speeds, the interception of said field by said ionized gas particles causing an electrical current to flow between said electrodes.

References Cited

UNITED STATES PATENTS

| | | |
|---|---|---|
| 1,530,468 | 3/1925 | Elliott. |
| 2,740,055 | 3/1956 | Ziniuk _____ 307—26 |
| 2,875,397 | 2/1959 | Parks _____ 321—49 |
| 3,002,142 | 9/1961 | Jensen _____ 331—56 |

FOREIGN PATENTS

| | | |
|---|---|---|
| 1,161,079 | 3/1958 | France. |
| 692,706 | 6/1940 | Germany. |
| 841,613 | 6/1952 | Germany. |

OTHER REFERENCES

Galvanomagnetic and Thermoelectric Effects, by Campbell, 1923, pp. 1 and 26.

MILTON O. HIRSHFIELD, *Primary Examiner.*

S. BERNSTEIN, *Examiner.*

J. B. SOTAK, G. J. BUDOCK, D. X. SLINEY,
*Assistant Examiners.*